United States Patent
Zhong et al.

(10) Patent No.: US 11,818,513 B2
(45) Date of Patent: Nov. 14, 2023

(54) SELF-ADAPTIVE ADJUSTMENT METHOD AND ADJUSTMENT SYSTEM FOR BRIGHTNESS OF PROJECTION APPARATUS

(71) Applicant: CHENGDU XGIMI TECHNOLOGY CO., LTD., Sichuan (CN)

(72) Inventors: Bo Zhong, Sichuan (CN); Shi Xiao, Sichuan (CN); Xin Wang, Sichuan (CN); Jianjun He, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/778,403

(22) PCT Filed: Mar. 13, 2020

(86) PCT No.: PCT/CN2020/079159
§ 371 (c)(1),
(2) Date: May 19, 2022

(87) PCT Pub. No.: WO2021/103346
PCT Pub. Date: Jun. 3, 2021

(65) Prior Publication Data
US 2022/0408065 A1 Dec. 22, 2022

(30) Foreign Application Priority Data
Nov. 25, 2019 (CN) .......................... 201911164783.6

(51) Int. Cl.
*H04N 9/31* (2006.01)
(52) U.S. Cl.
CPC ......... *H04N 9/3155* (2013.01); *H04N 9/3188* (2013.01); *H04N 9/3191* (2013.01)

(58) Field of Classification Search
CPC .. H04N 9/3155; H04N 9/3188; H04N 9/3191; H04N 9/3158; H04N 9/3194; H04N 9/317; H04N 9/3179
See application file for complete search history.

(56) References Cited

U.S. PATENT DOCUMENTS

| 2017/0168294 A1* | 6/2017 | Yamaguchi | .......... G02B 27/142 |
| 2018/0284588 A1 | 10/2018 | Wu et al. | |

(Continued)

FOREIGN PATENT DOCUMENTS

| CN | 102662295 A | 9/2012 |
| CN | 104360567 A | 2/2015 |

(Continued)

OTHER PUBLICATIONS

International Search Report for corresponding application PCT/CN2020/079159 filed Mar. 13, 2020, dated Aug. 11, 2020.

(Continued)

*Primary Examiner* — Michael Lee
(74) *Attorney, Agent, or Firm* — Gang Yu

(57) ABSTRACT

The embodiments of the disclosure relates to the technical field of projection adjustment. Embodiments specifically disclose a self-adaptive adjustment method and adjustment system for brightness of a projection apparatus. In the disclosure, ambient illuminance and a projection distance of the projection apparatus are obtained by controlling an illuminance sensor and a distance sensor, and a functional relationship among the ambient illuminance, projection plane illuminance and the projection distance is found through analysis and modeling of a large amount of data.

9 Claims, 4 Drawing Sheets

(56) References Cited

U.S. PATENT DOCUMENTS

2020/0081329 A1\* 3/2020 Cheng .................. G03B 21/145
2020/0177855 A1\* 6/2020 Miao .................... H04N 9/3185

FOREIGN PATENT DOCUMENTS

| CN | 106612421 | A | \* | 5/2017 | | |
| CN | 106612421 | A | | 5/2017 | | |
| CN | 107305312 | A | | 10/2017 | | |
| CN | 107515509 | A | \* | 12/2017 | | |
| CN | 108600714 | A | \* | 9/2018 | | |
| CN | 108600714 | A | | 9/2018 | | |
| CN | 109036235 | A | \* | 12/2018 | | |
| CN | 110798671 | A | | 2/2020 | | |
| JP | 2002300498 | A | | 10/2002 | | |
| KR | 2010045871 | A | \* | 5/2010 | ........ | H04M 1/72519 |
| TW | 201737701 | A | \* | 10/2017 | | |

OTHER PUBLICATIONS

First Search Report for corresponding CN application No. 201911164783.6 filed Nov. 25, 2019.

\* cited by examiner

SELF-ADAPTIVE ADJUSTMENT METHOD AND ADJUSTMENT SYSTEM FOR BRIGHTNESS OF PROJECTION APPARATUS

TECHNICAL FIELD

The embodiments of the disclosure relates to the technical field of projection adjustment, and in particular to a self-adaptive adjustment method and adjustment system for brightness of a projection apparatus.

BACKGROUND

At present, brightness of a projection system and traditional display screens is principally adjusted as follows. 1. Manual adjustment: the method requires human participation to change a brightness level on an interactive interface or a luminous intensity of a single light emitting diode (LED) lamp to adjust a brightness custom mode, a scene mode in traditional televisions, etc. The human participation involves long adjustment time and repeated adjustment, and influence of user adjustment on the projection color balance is unknown, possibly resulting in a problem of projection color distortion after the user adjustment. In addition, various scene modes corresponding to different brightness impose burden of selection and switching back and forth on users. 2. Automatic adjustment: (1) Adjustment based on ambient light collection: a transducer/sensor, a detector, can sense measured information and convert the sensed information into electrical signals or information output of other required forms according to certain rules, so as to satisfy requirements of information transmission, processing, storage, display, recording and control. Illuminance sensors are often used in automatic brightness adjustment through different methods. For example, in the patent "CN104360567A-adaptive projection brightness adjustment method for projection system", a plurality of illuminance sensors are mounted on a projection screen, and actual brightness of projection is estimated by collecting illuminance data of a plurality of points on a projection plane, so that an appropriate projection brightness value is analyzed and estimated by a control component, and further brightness is adjusted by a brightness control component. The method has several defects: ① A plurality of illuminance sensors are required to collect illuminance data on a projection plane, so as to accurately estimate a brightness value, but they are complicated to mount and unsuitable for portable projection devices. ② The use of a plurality of sensors causes increase in cost. ③ Environmental fault tolerance is poor, for example, under the condition of strong light illumination, illuminance data collected by an illuminance sensor is higher than actual projection brightness. In this case, an effect after brightness adjustment is undesirable due to large errors. In addition, the patent "CN106133643A-adjusting display brightness based on user distance" uses an illuminance sensor to automatically adjust brightness on a traditional display screen. In the patent, the illuminance sensor is used to obtain ambient illuminance information of a display device, based on which a luminous intensity of the display screen is adjusted. Similarly, in the patent, influence of a self-luminous source of the display screen on the illuminance sensor is not eliminated. Under certain conditions, if environmental information collected by the illuminance sensor is influenced by light of the display screen, deviation to an adjustment effect will be produced. (2) Measurement distance adjustment: nowadays, it's common practice to use infrared light or ultrasonic sensors to compute a distance through "time of flight method". Specifically, a distance between objects is computed by emitting a particularly short pulse, measuring time from emission of the light pulse to reflection of the pulse by the objects and measuring a time interval. With reference to distance information of projection, the closer the distance is, the larger the illuminance value is, so that it is necessary to reduce a luminous intensity of projection; and the farther the distance is, the smaller the illuminance value is, so that it is necessary to improve the luminous intensity. A method of adjusting brightness according to a distance is not only shown in a projection system, and there is also an application on the display screen for adjusting the luminous intensity of the display screen by sensing a distance between a user and the display screen.

The above automatic brightness adjustment methods are similar in that brightness of the projection system or the display screen is adjusted by sensing environmental data, and are different in that details of using environmental data are different. The problems of the above adjustment methods are as follows: 1. Adjustment efficiency: an existing manual brightness adjustment method requires human participation, resulting in long adjustment time and a poor effect, and readjustment is required after a working environment changes. 2. Stability: during automatic adjustment, data collected by a light sensor is likely to be influenced by reflected light from a projection picture or a display screen, leading to a poor adjustment effect. 3. Information supplement to environmental data for brightness adjustment is insufficient, and means for brightness adjustment are not combined. 4. After brightness adjustment, projection color coordinates are deviated, causing color distortion.

SUMMARY

In view of this, the embodiments of the disclosure provides a self-adaptive adjustment method and adjustment system for brightness of a projection apparatus, so as to solve all or at least some of the problems described above.

To solve the technical problems, the technical solution provided in the disclosure is the self-adaptive adjustment method for brightness of a projection apparatus. The method includes:

S11: collecting an ambient illuminance value and a projection distance value of the projection apparatus;

S12: computing a projection plane illuminance value of the projection apparatus according to a relation function between the projection plane illuminance value and the ambient illuminance value as well as the projection distance value and the acquired ambient illuminance value and projection distance value of the projection apparatus; and S13: adjusting brightness of the projection apparatus according to the projection plane illuminance value of the projection apparatus.

Alternatively, the collecting an ambient illuminance value in S11 includes:

S1111: projecting an nth frame of projected image, where n is a positive integer;

S1112: collecting the ambient illuminance value at least twice in a projection gap period;

S1113: determining whether n is larger than the preset number of projected frames, proceeding to S1114 under the condition that n is larger than the preset number of projected frames, and n=n+1 and returning to S1111 under the condition that n is not larger than the preset number of projected frames;

S1114: computing a trimmed mean of all collected ambient illuminance values, so as to obtain a final ambient illuminance value.

Alternatively, the collecting an ambient illuminance value in S11 includes:

S1121: projecting an nth frame of projected image, where n is a positive integer;

S1122: acquiring a data source brightness value of the projected image, and simultaneously collecting an ambient illuminance value of the projected image, so as to obtain a group of data source brightness value-ambient illuminance value data;

S1123: determining whether n is larger than the preset number of projected frames, proceeding to S1124 under the condition that n is larger than the preset number of projected frames, and n=n+1 and returning to S1121 under the condition that n is not larger than the preset number of projected frames;

S1124: using a least square method to fit a relation curve function $L(x)=ax^2+bx+c$ between a plurality of groups of data source brightness value-ambient illuminance value data, where x is a data source brightness value of the projected image, L is an ambient illuminance value of the projected image, and a, b and c are constants; and S1125: computing, according to the fitted relation curve function, an ambient illuminance value of the projected image when the data source brightness value of the projected image is 0, so as to obtain a final ambient illuminance value.

Alternatively, S12 includes:

S121: acquiring the relation function $L(l,d)=a \cdot l+\lambda \cdot d+\beta+r$ between the projection plane illuminance value and the ambient illuminance value as well as the projection distance value, where d is the projection distance value, l is the ambient illuminance value, L is the projection plane illuminance value, and $\alpha, \beta, \lambda$ and r are constants; and S122: substituting the acquired ambient illuminance value land projection distance value d into the relation function between the projection plane illuminance value and the ambient illuminance value as well as the projection distance value for computation, so as to obtain a projection plane illuminance value.

Alternatively, S121 includes:

S1211: changing the ambient illuminance value at a same projection distance, adjusting projection to an optimal light and shadow effect, recording a corresponding projection plane illuminance value, so as to obtain a plurality of groups of ambient illuminance value-projection plane illuminance value data, and obtaining a curve relation function $L_l(l)=\partial \cdot l+\beta$ between the ambient illuminance value and the projection plane illuminance value through curve fitting, where l is the ambient illuminance value, L is the projection plane illuminance value, and $\partial$ and $\beta$ are constants;

S1212: changing a projection distance in a darkroom environment, adjusting projection to an optimal light and shadow effect, recording a corresponding projection plane illuminance value, so as to obtain a plurality of groups of projection distance-projection plane illuminance value data, and obtaining a curve relation function $L_d(d)=\kappa \cdot d+\gamma$ between the projection distance and the projection plane illuminance value through curve fitting, where d is the projection distance, L is the projection plane illuminance value, and k and y are constants; and S1213: obtaining the relation function $L(l,d)=\alpha \cdot l+\lambda \cdot d+\beta+r$ between the projection plane illuminance value and the ambient illuminance value as well as the projection distance value by combining the curve relation function between the ambient illuminance value and the projection plane illuminance value and the curve relation function between the projection distance and the projection plane illuminance value, where d is the projection distance, l is the ambient illuminance value, L is the projection plane illuminance value, and $\alpha, \lambda, \beta$ and r are constants.

Alternatively, S13 includes:

S131: computing a luminous component driving current value according to the projection plane illuminance value;

S132: determining whether the luminous component driving current value exceeds a maximum luminous component driving current value, proceeding to S134 under the condition that the luminous component driving current value exceeds the maximum luminous component driving current value, and proceeding to S133 under the condition that the luminous component driving current value does not exceed the maximum luminous component driving current value;

S133: adjusting a luminous component driving current to the luminous component driving current value; and S134: adjusting the luminous component driving current to the maximum driving current value, and adjusting an optical zoom factor of the projection apparatus according to a relation function between the projection plane illuminance value and the optical zoom factor.

Alternatively, S131 involves:

a fitted curve relation model $$F(I) = \frac{a+bI}{1+cI+dI^2}$$

between driving currents of red, green and blue lights and color coordinate values, where I represents a magnitude of the driving current of the corresponding red, green or blue light, a, b, c and d are constants, and F is a corresponding color coordinate value; a formula of a red light current and a color coordinate x is $WR_x(I_R)$, and a formula of the red light current and a color coordinate y is $WR_y(I_R)$; a formula of a green light current and the color coordinate x is $WG_x(I_G)$, and a formula of the green light current and the color coordinate y is $WG_y(I_G)$; and a formula of a blue light current and the color coordinate x is $WB_x(I_B)$, and a formula of the blue light current and the color coordinate y is $WB_y(I_B)$;

using a model $L(I)=K \cdot I+M$ according to a linear relation of influence of current changes of the red, green and blue lights on the projection plane illuminance value in a certain range, where K and m are constants; and relations between current values of the red, green and blue lights and the projection plane illuminance value are $LR(I_R)=K_R \cdot I_R+m_R$, $LG(I_G)=K_G \cdot I_G+m_G$ and $LB(I_B)=K_B \cdot I_B+m_B$ respectively;

setting color coordinates of the projection apparatus before brightness adjustment as $(x_0, y_0)$ and the projection plane illuminance value as $L_0$, where target color coordinates after adjustment are $(x_t, y_t)$, a target projection plane illuminance value is $L_t$, and the projection apparatus is corrected for color balance before leaving factories, so conditions of $x_0=x_t$ and $y_0=y_t$ are met;

recording currents of the red, green and blue lights before adjustment as $I_{R0}$, $I_{G0}$ and $I_{B0}$ respectively and the currents of the red, green and blue lights after adjustment as $I_{Rt}$, $I_{Gt}$ and $I_{Bt}$ respectively, where current changes of the red, green and blue lights are: $\Delta I_R = I_{R0} - I_{Rt}$, $\Delta I_G = I_{G0} - I_{Gt}$ and $\Delta I_B = I_{B0} - I_{Bt}$ respectively;

after a change of the red light current: an x color coordinate change is: $\Delta WR_x = WR_x(I_{R0}) - WR_x(I_{Rt})$, and a y coordinate change is: $\Delta WR_y = WR_y(I_{R0}) - WR_y(I_{Rt})$;

after a change of the green light current: an x color coordinate change is: $\Delta WG_x = WG_x(I_{G0}) - WG_x(I_{Gt})$, and a y coordinate change is: $\Delta WG_y = WG_y(I_{G0}) - WG_y(I_{Gt})$;

after a change of the blue light current: an x color coordinate change is: $\Delta WB_x = WB_x(I_{B0}) - WB_x(I_{Bt})$, and a y coordinate change is: $\Delta WB_y = WB_y(I_{B0}) - WB_y(I_{Bt})$;

after the change of the red light current, a change of the projection plane illuminance value is: $\Delta LR = K_R \cdot (I_{R0} - I_{Rt})$;

after the change of the green light current, a change of the projection plane illuminance value is: $\Delta LG = K_G \cdot (I_{G0} - I_{Gt})$; and after the change of the blue light current, a change of the projection plane illuminance value is: $\Delta LB = K_B \cdot (I_{B0} - I_{Bt})$; and solve equations according to requirements that color coordinates before and after brightness adjustment of the projection apparatus are unchanged but the projection plane illuminance value changes, $$\Delta WR_x + \Delta WG_x + \Delta WB_x = 0,$$

$$\Delta WR_y + \Delta WG_y + \Delta WB_y = 0,$$

$$L_t = L_0 - \Delta LR + \Delta LG + \Delta LB;$$

where $I_{R0}$, $I_{G0}$, $I_{B0}$, $L_t$ and $L_0$ are all known conditions, and the equations are solved to obtain target current values $I_{Rt}$, $I_{Gt}$ and $I_{Bt}$ of the red, green and blue lights. Alternatively, S133 includes:

obtaining the relation function $H(S) = w \cdot S^2 + v \cdot S + o$ between the projection plane illuminance value and the optical zoom factor, where $H \in (-1,1)$ is a zoom factor, and w, v and o are constants;

computing a required zoom factor S according to $H(S) = (A_t - A_0)/A_0$ when the projection plane illuminance value is $A_0$ under the condition that a target projection plane illuminance value is $A_t$ and the zoom factor is not adjusted; and controlling an electric motor to drive the projection apparatus to adjust to the required zoom factor S.

Alternatively, the obtaining the relation function between the projection plane illuminance value and the optical zoom factor includes:

measuring a projection plane illuminance value, which is recorded as $A_0$, in a darkroom environment and at a fixed projection distance when the zoom factor is not adjusted;

adjusting the optical zoom factor to $S_1$, measuring the projection plane illuminance value as $A_1$, computing a change percentage $$H_1 = \frac{A_1 - A_0}{A_0}$$

of the projection plane illuminance value of the projection apparatus, so as to obtain data $(S_1, H_1)$, and similarly to further obtain $(S_2, H_2)$, $(S_3, H_3)$, $(S_n, H_n)$; and using a least square method to fit the obtained data set, and obtaining the relation function $H(S) = w \cdot S^2 + v \cdot S + o$ between the projection plane illuminance value and the optical zoom factor, where $H \in (-1,1)$, S is a zoom factor, and w, n and o are constants.

The embodiments of the disclosure further provides a self-adaptive adjustment system for brightness of a projection apparatus. The system includes:

a collection control component configured to collect an ambient illuminance value and a projection distance value of the projection apparatus;

an illuminance value computing component configured to compute a projection plane illuminance value of the projection apparatus according to a relation function between the projection plane illuminance value and the ambient illuminance value as well as the projection distance value and the acquired ambient illuminance value and projection distance value of the projection apparatus; and a brightness adjusting component configured to adjust brightness of the projection apparatus according to the projection plane illuminance value of the projection apparatus.

The embodiments of the disclosure further provides a self-adaptive adjustment system for brightness of a projection apparatus. The system includes:

a memory configured to store a computer program; and a processor configured to execute the computer program so as to implement steps of the self-adaptive adjustment method for brightness of a projection apparatus as described above.

The embodiments of the disclosure further provides a readable storage medium. The readable storage medium stores a computer program, and the computer program, when being executed by a processor, implements steps of the self-adaptive adjustment method for brightness of a projection apparatus as described above.

BRIEF DESCRIPTION OF THE DRAWINGS

To illustrate embodiments of the disclosure more clearly, a brief introduction to the drawings required for the embodiments will be provided below. Obviously, the drawings in the following description are merely some of the embodiments of the disclosure, and those of ordinary skill in the art would also have obtained other drawings according to these drawings without involving any inventive effort.

DETAILED DESCRIPTION OF THE EMBODIMENTS

Technical solutions in embodiments of the disclosure are clearly and completely described below with reference to the accompanying drawings in the embodiments of the disclosure. Apparently, the described embodiments are merely a part rather than all of the embodiments of the disclosure. All other embodiments obtained by those of ordinary skill in the art on the basis of the embodiments of the disclosure without creative efforts shall fall within the protection scope of the disclosure.

To make a person skilled in the art better understand a technical solution of the disclosure, the disclosure is further described in detail below with reference to the accompanying drawings and specific embodiments.

In the technical solution of the disclosure, ambient illuminance and a projection distance of a projection apparatus are obtained by controlling an illuminance sensor and a distance sensor, and a functional relationship between the "ambient illuminance", "projection plane illuminance" and the "projection distance" is found through analysis and modeling of a large amount of data. In an actual projection process, the ambient illuminance and the projection distance of the projection apparatus during working are collected by sensors, and appropriate brightness of the projection apparatus can be computed and the projection apparatus can adjust to the appropriate brightness; and moreover, stability of color points is guaranteed, and viewing experience of users is improved. Since there is no need for human intervention in the method, a whole process is automatically completed in extremely short time. The technical solution of the disclosure may be applied to projectors (long-focus/short-focus, etc.), laser televisions and other devices with projection functions.

Lumens are usually used to indicate brightness of the projection apparatus, which refers to a luminous flux or visibility of the projection apparatus. A measurement method is defined by American National Standards Institute. Generally, mean illuminance of 9 points is obtained by dividing the sum of illuminance (unit: lux (Lx)) of the 9 points by 9, and then a luminous flux of a whole projection picture is obtained by multiplying the mean illuminance by an area: ANSI lumens. The brightness in the technical solution of the disclosure is actually the luminous flux of the whole projection picture.

Figure 1:
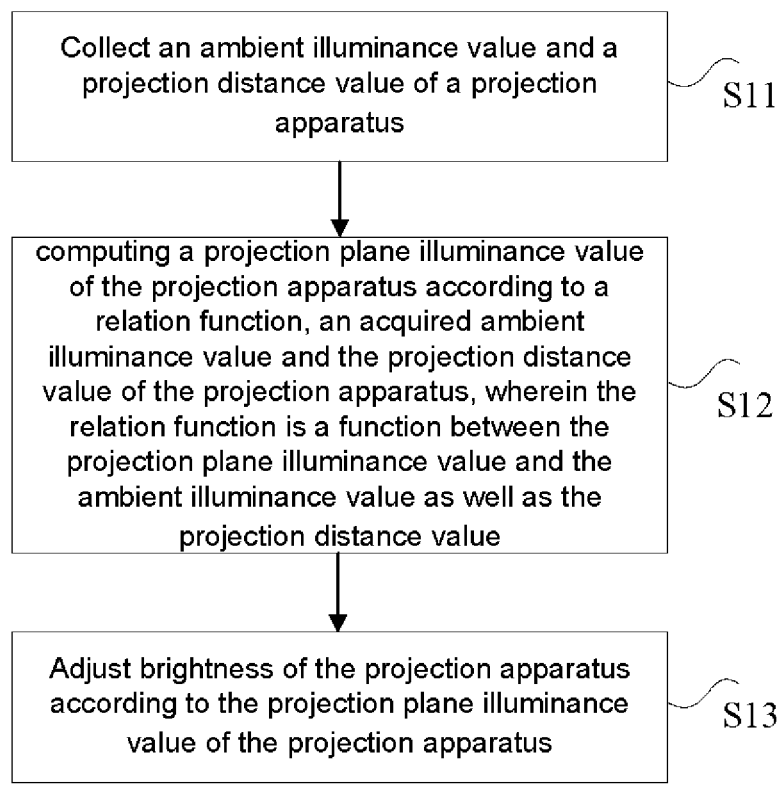
FIG. 1 is a schematic flowchart of a self-adaptive adjustment method for brightness of a projection apparatus provided in an embodiment of the disclosure.

As shown in FIG. 1, an embodiment of the disclosure provides a self-adaptive adjustment method for brightness of a projection apparatus. The method specifically includes:

S11: an ambient illuminance value and a projection distance value of the projection apparatus are collected;

S12: a projection plane illuminance value of the projection apparatus is computed according to a relation function between the projection plane illuminance value and the ambient illuminance value as well as the projection distance value and the acquired ambient illuminance value and projection distance value of the projection apparatus; and S13: brightness of the projection apparatus is adjusted according to the projection plane illuminance value of the projection apparatus.

Alternatively, in the embodiment, the illuminance sensor is used to sense projection ambient illuminance, and the distance sensor is used to measure a distance between a projection device and a projection plane. Referable illuminance sensor components include, but are not limited to, OPT3001, OPT3006 and BH1750FVL. Referable distance measurement components include, but are not limited to, VL53L1X, VL53L0X and TMF8801. A part related to brightness in the projection apparatus may be subdivided into a sensor data processing component, a brightness algorithm component and a brightness control component. A data processing component is in communication with a sensor by means of a hardware interface of the sensor, and controls sensor initialization, data measurement, data reading, filtering, etc. The brightness algorithm component mainly uses the ambient illuminance data and projection distance data obtained by a sensor for computation, so as to obtain required brightness to be adjusted. The brightness control component adjusts brightness of a device by adjusting a current, an optical zoom factor or an aperture size or through other methods according to the required brightness to be adjusted, so as to ensure that a user is always at optimal viewing brightness.

Sensors (including the illuminance sensor and the distance sensor) are connected to a control unit of the projection apparatus by means of hardware interfaces provided by the sensors, thereby realizing normal communication, and the control unit may control the sensors to conduct sampling, data reading and other operations. The sensors may be mounted on a housing of the projection apparatus, and a cover sheet, etc. for appearance optimization is added for necessary packaging. The control unit requires an interface for controlling a luminous component current, so as to facilitate change of a current value. In addition, the control unit is provided with an interface for controlling an electric motor to drive the projection apparatus and changing the optical zoom factor of the projection apparatus.

Figure 2:
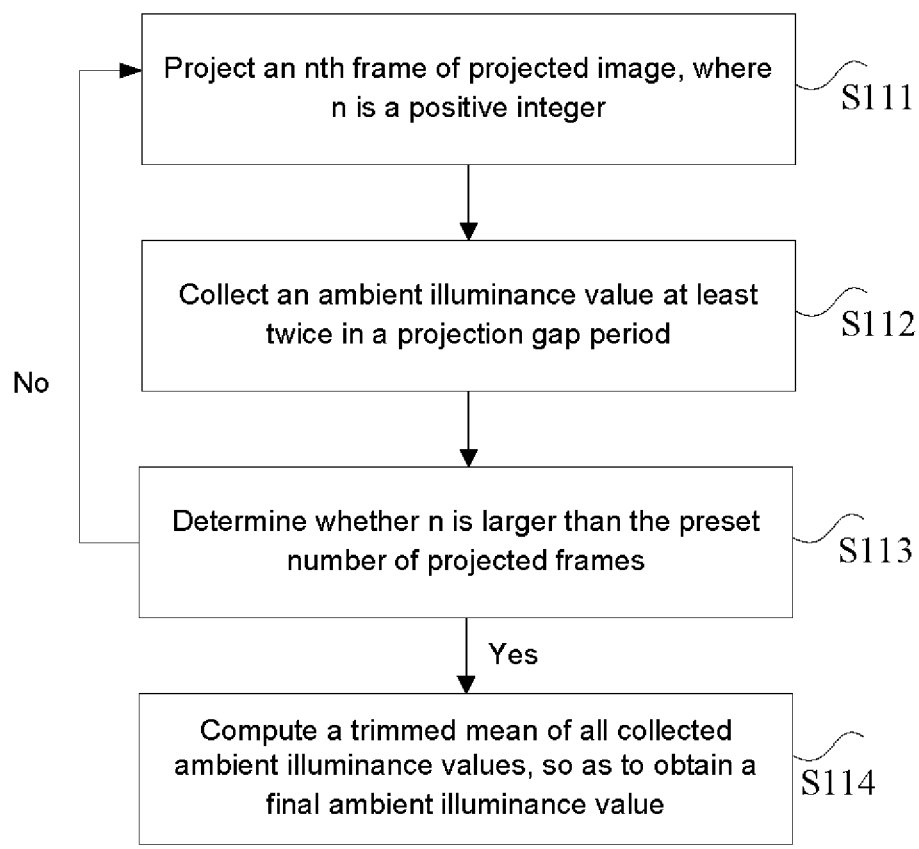
FIG. 2 is a schematic flowchart of a method for collecting an ambient illuminance value provided in an embodiment of the disclosure.

The control unit of the projection apparatus uses the illuminance sensor and a display component of the projection apparatus to obtain ambient illuminance. Because the projection apparatus may emit light when displaying a picture and show diffuse reflection on a projection screen or wall surface, data measurement of the illuminance sensor is influenced. To obtain accurate ambient illuminance information and guarantee accuracy of subsequent projection illuminance computation, the following two ambient light measurement methods may be used:

It is to be noted that in a first method as shown in FIG. 2, the method that an ambient illuminance value is collected in S11 includes:

S1111: an nth frame of projected image is projected, where n is a positive integer;

S1112: the ambient illuminance value is collected at least twice in a projection gap period;

S1113: whether n is larger than the preset number of projected frames is determined, S1114 is proceeded to under the condition that n is larger than the preset number of projected frames, and n=n+1 and S1111 is returned to under the condition that n is not larger than the preset number of projected frames; and S1114: a trimmed mean of all collected ambient illuminance values is computed, so as to obtain a final ambient illuminance value.

Alternatively, the projection picture is actually formed by continuously displaying a plurality of frames of pictures in short time, and frame rates of different projection apparatus are different. However, between frames, the projection apparatus is in the projection gap period, and no picture is displayed on the projection plane. A frame projection sequence of the projection apparatus and a sampling sequence of the illuminance sensor are controlled, and an illuminometer is controlled to sample ambient light between display frame sequences of the projection apparatus.

Alternatively, according to the following sequence control, in time t between projecting a first frame of projected image and projecting a second frame of projected image, the illuminance sensor is controlled to continuously collect the ambient illuminance at least twice, ambient light sampling is also conducted between a second frame and a third frame, and the trimmed mean is obtained by using series data. The trimmed mean is used in computation of the ambient illuminance value, thereby avoiding influence of projected reflected light on sampling data of the illuminance sensor and further reducing errors caused by sampling fluctuation.

Figure 3:
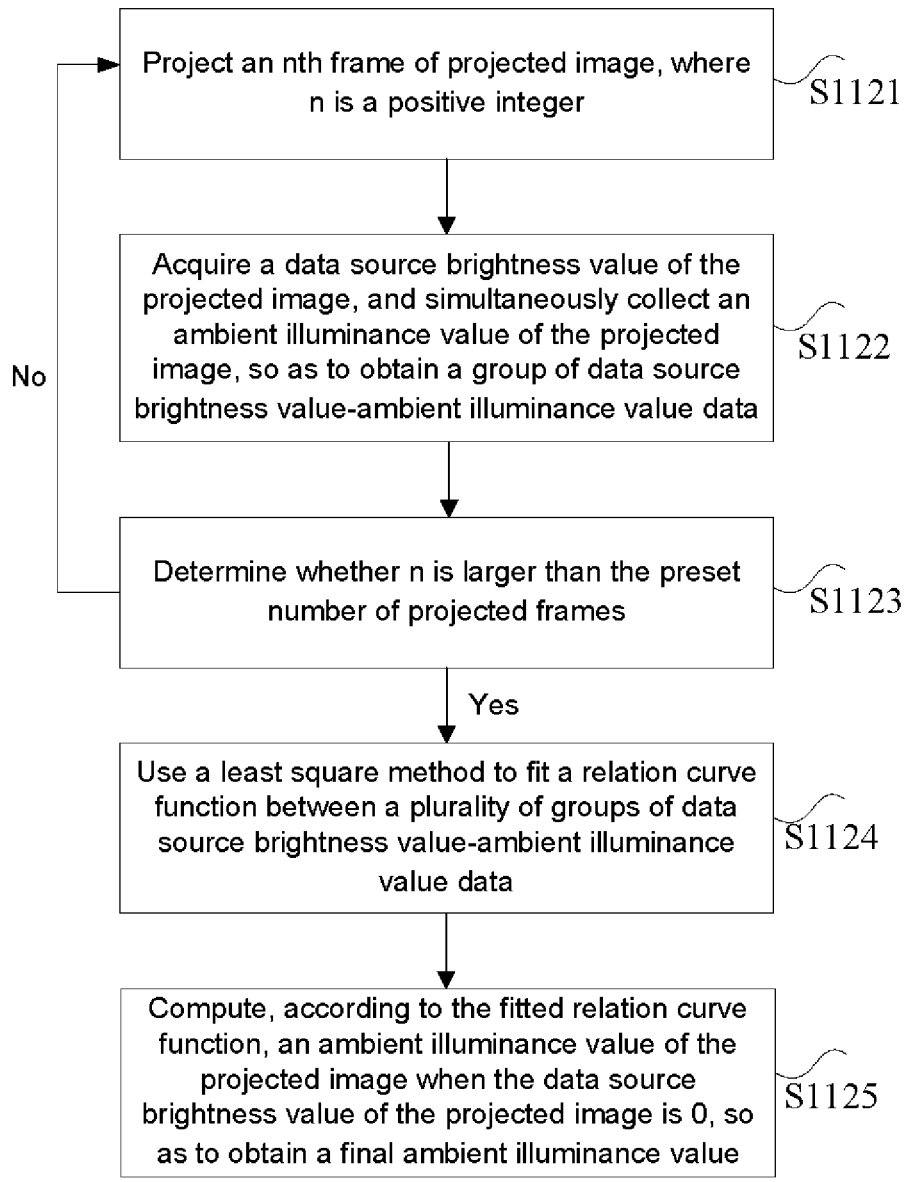
FIG. 3 is a schematic flowchart of another method for collecting an ambient illuminance value provided in an embodiment of the disclosure.

It is to be noted that in a second method as shown in FIG. 3, the method that an ambient illuminance value is collected in S11 includes:

S1121: an nth frame of projected image is projected, where n is a positive integer;

S1122: a data source brightness value of the projected image is acquired, and an ambient illuminance value of the projected image is simultaneously collected, so as to obtain a group of data source brightness value-ambient illuminance value data;

S1123: whether n is larger than the preset number of projected frames is determined, S1124 is proceeded to under the condition that n is larger than the preset number of projected frames, and n=n+1 and S1121 is returned to under the condition that n is not larger than the preset number of projected frames;

S1124: a least square method is used to fit a relation curve function $L(X)=ax^2+bx+c$ between a plurality of groups of data source brightness value-ambient illuminance value data, where x is a data source brightness value of the projected image, L is an ambient illuminance value of the projected image, and a, b and c are constants; and S1125: according to the fitted relation curve function, an ambient illuminance value of the projected image when the data source brightness value of the projected image is 0 is computed, so as to obtain a final ambient illuminance value.

Alternatively, analysis and processing are conducted according to changes of brightness data of a projected image data source and changes of sampling data of a sensor, so as to eliminate data deviation caused by the projected reflected light. Specific steps are as follows: (1) image information of the projected image data source is intercepted, and in this case, brightness information of a picture is analyzed; and the illuminance sensor is used for sampling while a projected image is intercepted, and sampled illuminance of the sensor at the same time is obtained. According to the steps, a picture content of the projected image is changed, and the picture content needs to be changed in brightness, so as to obtain a plurality of data sets (data source brightness value 1, sensor sampled ambient illuminance value 1), (data source brightness value 2, sensor sampled ambient illuminance value 2) and so on. (2) The least square method is used to fit a relation curve between two kinds of data, which is a common quadratic function model like: $L(X)=ax^2+bx+c$, where x is a projected image data source brightness value, and L is an ambient illuminance value measured by the illuminance sensor. The ambient illuminance value when the projected image data source brightness value is 0 is computed by analyzing the curve, and influence of the projected reflected light is eliminated. Changes of an environment are unknown when the projection apparatus is working, so fitting needs to be conducted according to the model before each time of brightness adjustment, and values of a, b and c are dynamically variable.

It is to be noted that in the method that a projection distance value is collected in S11, the control unit of the projection apparatus controls the distance sensor to obtain a working distance of the projection apparatus: the sensor may be an infrared sensor, an ultrasonic sensor or other devices that may accurately measure a distance in a certain range. To accurately obtain the working distance of the projection apparatus, the sensor is mounted on a housing of a main machine of the projection apparatus, and a measuring probe is exposed to the outside, with a field of vision (Fov) area required to be within a projection area, so as to ensure that an accurate projection distance is obtained without being influenced by other obstacles in the environment, thereby avoiding distance measurement errors.

It is to be noted that S12 includes:

S121: the relation function $L(l, d)=\alpha \cdot l + \lambda \cdot d + \beta + r$ between the projection plane illuminance value and the ambient illuminance value as well as the projection distance value is acquired, where d is the projection distance value, l is the ambient illuminance value, L is the projection plane illuminance value, and $\alpha$, $\lambda$, $\beta$ and r are constants; and S122: the acquired ambient illuminance value l and projection distance value dare substituted into the relation function between the projection plane illuminance value and the ambient illuminance value as well as the projection distance value for computation, so as to obtain a projection plane illuminance value.

It is to be noted that S121 includes:

S1211: the ambient illuminance value is changed at a same projection distance, projection is adjusted to an optimal light and shadow effect, a corresponding projection plane illuminance value is recorded, so as to obtain a plurality of groups of ambient illuminance value-projection plane illuminance value data, and a curve relation function $L_l(l)=\partial \cdot l + \beta$ between the ambient illuminance value and the projection plane illuminance value is obtained through curve fitting, where l is the ambient illuminance value, L is the projection plane illuminance value, and $\partial$ and $\beta$ are constants.

Alternatively, curve fitting of the ambient illuminance and projection plane illuminance is conducted: at a same distance (the distance is variable and is usually computed according to a common distance, such as a distance for projection of 80 inches). The ambient illuminance is changed. Then, projection is adjusted to the optimal light and shadow effect. Data sets (illuminance sensor illuminance value 1, projection plane illuminance 1), (illuminance sensor illuminance value 2, projection plane illuminance 2) and so on are recorded. The steps are repeated to obtain a plurality of data sets. A curve relation $L_l(l)=\partial \cdot l + \beta$ between the ambient illuminance and the projection plane illuminance is obtained through curve fitting, where l is an illuminance sensor value, generally with a unit (lx), which is a measurement unit of an illuminance intensity. L is the projection plane illuminance value, and $\partial$ and $\beta$ are constants. Through the curve relation function, required projection plane illuminance may be computed according to ambient illuminance information at a same distance.

S1212: a projection distance is changed in a darkroom environment, projection is adjusted to an optimal light and shadow effect, a corresponding projection plane illuminance value is recorded, so as to obtain a plurality of groups of projection distance-projection plane illuminance value data, and a curve relation function $L_d(d)=\kappa \cdot d + \gamma$ between the projection distance and the projection plane illuminance value is obtained through curve fitting, where d is the projection distance, L is the projection plane illuminance value, and k and γ are constants.

Alternatively, curve fitting of the projection distance and the projection plane illuminance is conducted: based on curve fitting of the ambient illuminance and projection plane illuminance, the projection distance also changes because the working distance of the projection apparatus varies with different scenes of users. The farther the projection distance is, the smaller the projection plane illuminance is; and the closer the projection distance is, the larger the projection plane illuminance is. Under a darkroom condition, when point illuminance of the projection picture is high, a subjective feeling is bright, and when the point illuminance is low, the subjective feeling is dark. In a darkroom environment, the projection distance is changed and projection is adjusted to appropriate illuminance. If required illuminance is lower than a minimum projection illuminance, the illuminance is adjusted to the minimum illuminance; and if actual required illuminance is higher than a maximum projection luminous illuminance, the illuminance is adjusted to the maximum illuminance. At different projection distances, data (projection distance 1, projection plane illuminance 1), (projection distance 2, projection plane illuminance 2) and so on are recorded. A relation between optimal projection brightness and the projection distance is obtained through curve fitting, which is a relation function $L_d(d) = \kappa \cdot d + \gamma$ between the projection plane illuminance and the projection distance, where d is the projection distance, L is the projection plane illuminance value, and k and γ are constants.

S1213: the relation function $L(l,d) = \alpha \cdot l + \lambda \cdot d + \beta + r$ between the projection plane illuminance value and the ambient illuminance value as well as the projection distance value is obtained by combining the curve relation function between the ambient illuminance value and the projection plane illuminance value and the curve relation function between the projection distance and the projection plane illuminance value, where d is the projection distance, l is the ambient illuminance value, L is the projection plane illuminance value, and α, λ, β and r are constants.

Alternatively, in the darkroom environment, optimal viewing projection plane illuminance changing curves $L_d$ of different projection distances provide basic illuminance of $L_l(l) = \partial \cdot l + \beta$. In this case, the basic illuminance refers to optimal viewing illuminance in the darkroom environment at the projection distance d. Firstly, the basic illuminance without ambient light at the distance is computed according to a formula $L_d(d)$, and then projection brightness is adjusted on the basis of a basic illuminance value according to a formula $L_l(l)$ of projection ambient illuminance. A formula L(l,d) is obtained by adding the formulas for simplification, and an appropriate projection plane illuminance value may be computed according to differences between the projection distance and a projection ambient illuminance value. Finally, a formula for computing optimal viewing projection plane illuminance by combining the projection ambient illuminance and the projection distance is: $L(l,d) = \alpha \cdot l + \lambda \cdot d + \beta + r$, where d is the projection distance, l is the ambient illuminance value, L is the projection plane illuminance value, and α, λ, β and r are constants; and target projection plane illuminance $L_t$ in the environment is computed by putting illuminance sensor data and projection distance data into a formula L.

Figure 4:
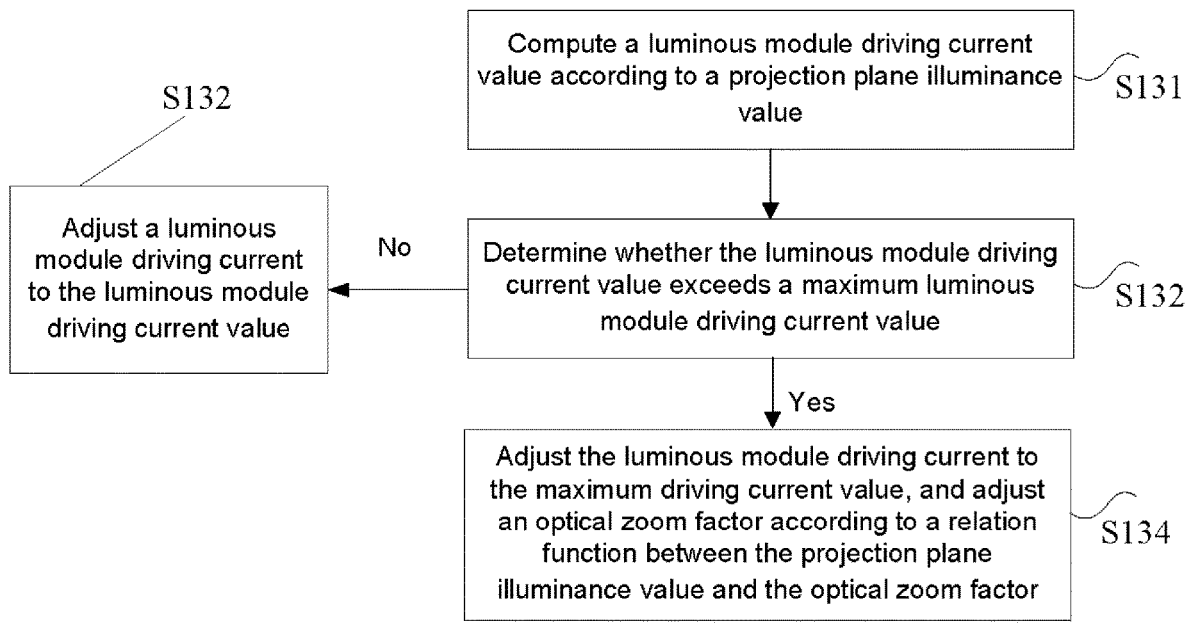
FIG. 4 is a schematic flowchart of a method for adjusting brightness of a projection apparatus according to a projection plane illuminance value of the projection apparatus provided in an embodiment of the disclosure.

It is to be noted that as shown in FIG. 4, S13 includes:

S131: a luminous component driving current value of the projection apparatus is computed according to the projection plane illuminance value;

S132: whether the luminous component driving current value of the projection apparatus exceeds a maximum luminous component driving current value is determined, S134 is proceeded to under the condition that the luminous component driving current value of the projection apparatus exceeds the maximum luminous component driving current value, and S133 is proceeded to under the condition that the luminous component driving current value of the projection apparatus does not exceed the maximum luminous component driving current value;

S133: a luminous component driving current is adjusted to the luminous component driving current value; and S134: the luminous component driving current is adjusted to the maximum driving current value, and an optical zoom factor of the projection apparatus is adjusted according to a relation function between the projection plane illuminance value and the optical zoom factor.

Alternatively, regarding current adjustment: for current monochromatic laser projection, a driving current of a light source may be simply adjusted so as to control a luminous intensity of a light, but for a tricolor laser light source or tricolor light emitting diode (LED) light source, it is necessary to consider adjusting influence of red, green and blue lights on illuminance. Extent of the influence on the illuminance is in a sequence of the green, red and blue lights. When the driving current is adjusted to target illuminance, the green light is adjusted, then the red light is adjusted, and finally the blue light is adjusted. The target illuminance is not realized by adjusting a driving current of only one of the lights because deviation of color coordinates of other colors synthesized with red, green and blue as primary colors will occur inevitably while the illuminance changes if the driving current of only one or two of the lights is changed, leading to color distortion.

It is to be noted that S131 involves:

a fitted curve relation model $$f(I) = \frac{a + bI}{1 + cI + dI^2}$$

between driving currents of red, green and blue lights and color coordinate values, where I represents a magnitude of the driving current of the corresponding red, green or blue light, a, b, c and d are constants, and F is a corresponding color coordinate value; a formula of a red light current and a color coordinate x is $WR_x(I_R)$, and a formula of the red light current and a color coordinate y is $WR_y(I_R)$; a formula of a green light current and the color coordinate x is $WG_x(I_G)$, and a formula of the green light current and the color coordinate y is $WG_y(I_G)$; and a formula of a blue light current and the color coordinate x is $WB_x(I_B)$, and a formula of the blue light current and the color coordinate y is $WB_y(I_B)$.

In addition, in the red, green and blue lights, currents may change to consistent extent, and the extent of the influence on the projection plane illuminance is in a sequence of the green light>the red light>the blue light. A model $L(I) = K \cdot I + M$ is used according to a linear relation of influence of current changes of the red, green and blue lights on the projection plane illuminance value in a certain range, where K and m are constants; and relations between current values of the red, green and blue lights and the projection plane illuminance value are $LR(I_R) = K_R \cdot I_R + m_R$, $LG(I_G) = K_G \cdot I_G + m_G$, $LB(I_B) = K_B \cdot I_B + m_B$, respectively.

Color coordinates of the projection apparatus before brightness adjustment are set as $(x_0, y_0)$ and the projection plane illuminance value is set as $L_0$, where target color coordinates after adjustment are $(x_t, y_t)$, a target projection plane illuminance value is $L_t$, and the projection apparatus is corrected for color balance before leaving factories, so conditions of $x_0=x_t$ and $y_0=y_t$ are met.

Currents of the red, green and blue lights before adjustment are recorded as $I_{R0}$, $I_{G0}$ and $I_{B0}$ respectively and the currents of the red, green and blue lights after adjustment are recorded as $I_{Rt}$, $I_{Gt}$ and $I_{Bt}$ respectively, where current changes of the red, green and blue lights are: $\Delta I_R = I_{R0} - I_{Rt}$, $\Delta I_G = I_{G0} - I_{Gt}$ and $\Delta I_B = I_{B0} - I_{Bt}$ respectively.

After a change of the red light current: an X color coordinate change is: $\Delta WR_x = WR_x(I_{R0}) \, WR_x(I_{Rt})$, and a y coordinate change is: $\Delta WR_y = WR_y(I_{R0}) \, WR_y(I_{Rt})$;

after a change of the green light current: an X color coordinate change is: $\Delta WG_x = WG_x(I_{G0}) - WG_x(I_{Gt})$, and a y coordinate change is: $\Delta WG_y = WG_y(I_{G0}) \, WG_y(I_{Gt})$; and after a change of the blue light current: an x color coordinate change is: $\Delta WB_x = WB_x(I_{B0}) - WB_x(I_{Bt})$, and a y coordinate change is: $\Delta WB_y = WR_y(I_{B0}) \, WR_y(I_{Bt})$.

After the change of the red light current, a change of the projection plane illuminance value is: $\Delta LR = K_R \cdot (I_{R0} - I_{Rt})$;

after the change of the green light current, a change of the projection plane illuminance value is: $\Delta LG = K_G \cdot (I_{G0} - I_{Gt})$; and after the change of the blue light current, a change of the projection plane illuminance value is: $\Delta LB = K_B \cdot (I_{B0} - I_{Bt})$.

The color coordinates before and after brightness adjustment are unchanged and satisfy: $x_t = x_0$; $y_t = y_0$; =>

$$\Delta WR_x + \Delta WG_x + \Delta WB_x = 0, \quad \text{①}$$

$$\Delta WR_y + \Delta WG_y + \Delta WB_y = 0, \quad \text{②}$$

The projection plane illuminance value satisfies:

$$L_t = L_0 - \Delta LR + \Delta LG + \Delta LB; \quad \text{③}$$

where $I_{R0}$, $I_{G0}$, $I_{B0}$, $L_t$ and $L_0$ are all known conditions, and the equations ①②③ are solved to obtain target current values $I_{Rt}$, $I_{Gt}$ and $I_{Bt}$ of the red, green and blue lights. A driving current control component of the projection apparatus is used to adjust to a target current, and when an area of the projection plane is unchanged, the projection illuminance is changed, so as to change the brightness of the projection apparatus.

It is to be noted that S133 includes:

the relation function $H(S) = w \cdot S^2 + v \cdot S + o$ between the projection plane illuminance value and the optical zoom factor is obtained, where $H \in (-1,1)$, S is a zoom factor, and w, v and o are constants;

a required zoom factor S is computed according to $H(S) = (A_t - A_0)/A_0$ when the projection plane illuminance value is $A_0$ under the condition that a target projection plane illuminance value is $A_t$ and the zoom factor is not adjusted; and an electric motor is controlled to drive the projection apparatus to adjust to the required zoom factor S.

Alternatively, the brightness is adjusted mainly according to: the luminous component driving current, Duty, a data source signal, the optical zoom factor and the aperture size. In the technical solution of the disclosure, firstly, the luminous component driving current is adjusted, illuminance of the projection picture is improved while a size of the projection picture is unchanged, and the projection brightness is improved; then, when brightness of the projection picture reaches a maximum level and cannot be continuously improved, the illuminance of the projection picture is improved by adjusting the optical zoom factor of a lens, which forms a contrast with projection ambient background brightness, so as to guarantee display details of the projection picture. The two methods are simpler, easy to operate, take effect quickly after adjustment, and have least influence on image quality.

Due to limitation of a maximum luminous intensity of the projection apparatus, when the brightness is adjusted, the required projection brightness still cannot be reached under the maximum driving current. In this case, the optical zoom factor may be changed through a design of driving a hardware connector (a gear, a belt or a screw) by a motor drive component, so as to change a projection ratio and improve the projection plane illuminance during viewing of a user. To reach expected optical zoom after adjustment, realize short debugging time and avoid switching of operations, it is necessary to establish a function model in advance. A model establishment component, that is, a method that the relation function between the projection plane illuminance value and the optical zoom factor is obtained includes:

(1) a projection plane illuminance value, which is recorded as $A_0$, in the darkroom environment and at a fixed projection distance (a common distance of a user device) when the zoom factor is not adjusted is measured;

(2) the optical zoom factor is adjusted to $S_1$, the projection plane illuminance value is measured as $A_1$, a change percentage $$H_1 = \frac{A_1 - A_0}{A_0}$$

of the projection plane illuminance value of the projection apparatus is computed, so as to obtain data $(S_1, H_1)$, (3) the steps in (2) are repeated to obtain $(S_2, H_2)$, $(S_3, H_3)$, ... $(S_n, H_n)$; and (4) a least square method is used to fit a data set obtained in (3), and the relation function $H(S) = w \cdot S^2 + v \cdot S + o$ between the projection plane illuminance value and the optical zoom factor is obtained, where $H \in (-1,1)$, S is a zoom factor, and w, v and o are constants.

The target projection plane illuminance value is $A_t$, the projection plane illuminance value $A_0$ is substituted into the relation function when the zoom factor is not adjusted, the required zoom factor S is computed, the electric motor is controlled for driving to adjust the zoom factor to the required zoom factor, and then a camera is used for autofocusing, so as to guarantee unchanged clarity of the projection picture.

In the embodiment provided in the disclosure, during work of the projection apparatus, the ambient illuminance and the projection distance are continuously measured by sensors so as to adjust the brightness of the projection apparatus under the following conditions: (1) when ambient light or a distance changes, target brightness is computed and the brightness is adjusted to the target brightness by means of the curve relation of the relation function between the projection plane illuminance value and the ambient illuminance value as well as the projection distance value; and (2) ambient light brightness remains unchanged or changes little, but the projection distance changes. Two adjustment methods may be selected: ① Whether the projection apparatus is still in motion is determined by a gyroscope, and when the projection apparatus is static, computation and brightness adjustment are conducted by means of the curve relation of the relation function between the projection plane illuminance value and the ambient illuminance value as well as the projection distance value. ② During motion of the projection apparatus, the ambient light and brightness are continuously collected, and computation and brightness adjustment for the projection apparatus are conducted by means of the curve relation of the relation function between the projection plane illuminance value and the ambient illuminance value as well as the projection distance value.

Compared with the prior art, the disclosure has the specific beneficial effects as follows: in the disclosure, ambient illuminance and a projection distance of the projection apparatus are obtained by controlling an illuminance sensor and a distance sensor, and a functional relationship between the ambient illuminance, projection plane illuminance and the projection distance is found through analysis and modeling of a large amount of data. In an actual projection process, the ambient illuminance and the projection distance of the projection apparatus during working are collected by sensors, and appropriate brightness of the projection apparatus may be computed and the projection apparatus may adjust to the appropriate brightness; and moreover, stability of color points is guaranteed, and viewing experience of users is improved. Since there is no need for human intervention, a whole process is automatically completed in extremely short time, and the disclosure is suitable for being widely popularized.

Figure 5:
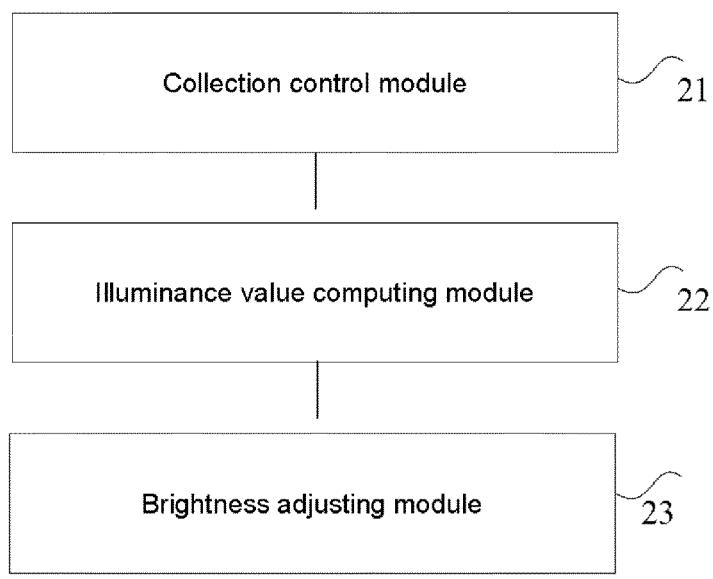
FIG. 5 is a structural schematic diagram of an adaptive adjustment system for brightness of a projection apparatus provided in an embodiment of the disclosure.

As shown in FIG. 5, an embodiment of the disclosure further provides an adaptive adjustment system for brightness of a projection apparatus. The system specifically includes:
  a collection control component 21 configured to collect an ambient illuminance value and a projection distance value of the projection apparatus;
  an illuminance value computing component 22 configured to compute a projection plane illuminance value of the projection apparatus according to a relation function between the projection plane illuminance value and the ambient illuminance value as well as the projection distance value and the acquired ambient illuminance value and projection distance value of the projection apparatus; and
  a brightness adjusting component 23 configured to adjust brightness of the projection apparatus according to the projection plane illuminance value of the projection apparatus.

Alternatively, the collection control component 21 includes:
  a first projection unit configured to project an nth frame of projected image, where n is a positive integer;
  a first collection unit configured to collect an ambient illuminance value at least twice in a projection gap period;
  a first determination unit configured to determine whether n is larger than the preset number of projected frames, go to a computing unit under the condition that n is larger than the preset number of projected frames, and n=n+1 and return to a projection unit under the condition that n is not larger than the preset number of projected frames; and
  a first computing unit configured to compute a trimmed mean of all collected ambient illuminance values, so as to obtain a final ambient illuminance value.

Alternatively, the collection control component 21 may further include:
  a second projection unit configured to project an nth frame of projected image, where n is a positive integer;
  a second collection unit configured to acquire a data source brightness value of the projected image, and simultaneously collect an ambient illuminance value of the projected image, so as to obtain a group of data source brightness value-ambient illuminance value data;
  a second determination unit configured to determine whether n is larger than the preset number of projected frames, go to a function fitting unit under the condition that n is larger than the preset number of projected frames, and n=n+1 and return to the second projection unit under the condition that n is not larger than the preset number of projected frames;
  the function fitting unit configured to use a least square method to fit a relation curve function $L(X)=ax^2+bx+c$ between a plurality of groups of data source brightness value-ambient illuminance value data, where x is a data source brightness value of the projected image, L is an ambient illuminance value of the projected image, and a, b and c are constants; and
  a second computing unit configured to compute, according to the fitted relation curve function, an ambient illuminance value of the projected image when the data source brightness value of the projected image is 0, so as to obtain a final ambient illuminance value.

Alternatively, the illuminance value computing component 22 includes:
  a function acquisition unit configured to acquire the relation function $L(l,d)=\alpha \cdot l+\lambda \cdot d+\beta+r$ between the projection plane illuminance value and the ambient illuminance value as well as the projection distance value, where d is the projection distance value, l is the ambient illuminance value, L is the projection plane illuminance value, and $\alpha$, $\lambda$, $\beta$ and r are constants; and
  an illuminance value computing unit configured to substitute the acquired ambient illuminance value l and projection distance value d into the relation function between the projection plane illuminance value and the ambient illuminance value as well as the projection distance value for computation, so as to obtain a projection plane illuminance value.

Alternatively, the brightness adjusting component 23 includes:
  a driving current computing unit configured to compute a luminous component driving current value of the projection apparatus according to the projection plane illuminance value;
  a driving current determination unit configured to determine whether the luminous component driving current value of the projection apparatus exceeds a maximum luminous component driving current value, go to an optical zoom adjustment unit under the condition that the luminous component driving current value of the projection apparatus exceeds the maximum luminous component driving current value, and go to a driving current adjustment unit under the condition that the luminous component driving current value of the projection apparatus does not exceed the maximum luminous component driving current value;

the driving current adjustment unit configured to adjust the luminous component driving current to the luminous component driving current value; and the optical zoom adjustment unit configured to adjust the luminous component driving current to the maximum driving current value, and adjust an optical zoom factor of the projection apparatus according to a relation function between the projection plane illuminance value and the optical zoom factor.

The description of features in the embodiment corresponding to FIG. 5 may refer to related descriptions of the embodiments corresponding to FIGS. 1-4, which will not be repeated herein.

An embodiment of the disclosure further provides a self-adaptive adjustment system for brightness of a projection apparatus, which includes: a memory configured to store a computer program; and a processor configured to execute the computer program so as to implement steps of the self-adaptive adjustment method for brightness of a projection apparatus as described above.

An embodiment of the disclosure further provides a readable storage medium. The readable storage medium stores a computer program, and the computer program, when being executed by a processor, implements steps of the self-adaptive adjustment method for brightness of a projection apparatus as described above.

The self-adaptive adjustment method and adjustment system for brightness of a projection apparatus and the readable storage medium provided in the embodiments of the disclosure are described in detail above. Each embodiment of the description is described in a progressive manner, each embodiment focuses on differences from other embodiments, and the same and similar parts between the embodiments can refer to each other. Since an apparatus disclosed in the embodiments corresponds to a method disclosed in the embodiments, the description is relatively simple, and relevant contents may be seen from partial description of the method. It should be noted that several improvements and modifications may also be made by those of ordinary skill in the art without departing from principles of the disclosure, which also fall within the scope of protection of the disclosure.

Specialized persons may further realize that units and algorithm steps of various examples described with reference to the embodiments disclosed herein can be implemented in electronic hardware, computer software or a combination of both. To clearly illustrate interchangeability of hardware and software, compositions and steps of the various examples have been generally described in terms of functionality in the description. Whether the functions are executed in hardware or software depends on the specific application and design constraints of the technical solution. Professionals may use different methods to implement the described functions for each specific application, but such implementation should not be considered to be beyond the scope of the disclosure.

Steps of a method or an algorithm described in connection with the embodiments disclosed herein may be directly implemented in hardware, in a software component executed by a processor, or in a combination of both. The software component may be placed in a random access memory (RAM), a memory, a read-only memory (ROM), an electrically programmable ROM, an electrically erasable programmable ROM, a register, a hard disk, a removable disk, CD-ROM, or any other form of storage mediums well known in the art.

What is claimed is:

1. A self-adaptive adjustment method for brightness of a projection apparatus, comprising:
    S11: collecting an ambient illuminance value and a projection distance value of the projection apparatus;
    collecting the ambient illuminance value in S11 comprises:
    S1111: projecting an nth frame of projected image, wherein n is a positive integer;
    S1112: collecting the ambient illuminance value at least twice in a projection gap period;
    S1113: determining whether n is larger than a preset number of projected frames, proceeding to S1114 under the condition that n is larger than the preset number of projected frames, and n=n+1 and returning to S1111 under the condition that n is not larger than the preset number of projected frames; and
    S1114: computing a trimmed mean of all collected ambient illuminance values, so as to obtain a final ambient illuminance value;
    S12: computing a projection plane illuminance value of the projection apparatus according to a relation function, an acquired ambient illuminance value and the projection distance value of the projection apparatus, wherein the relation function is a function between the projection plane illuminance value and the ambient illuminance value as well as the projection distance value; and
    S13: adjusting brightness of the projection apparatus according to the projection plane illuminance value of the projection apparatus.

2. The self-adaptive adjustment method for brightness of the projection apparatus as claimed in claim 1, wherein the collecting the ambient illuminance value in S11 comprises:
    S1121: projecting an nth frame of projected image, wherein n is a positive integer;
    S1122: acquiring a data source brightness value of the projected image, and simultaneously collecting an ambient illuminance value of the projected image, so as to obtain a group of data source brightness value-ambient illuminance value data;
    S1123: determining whether n is larger than the preset number of projected frames, proceeding to S1124 under the condition that n is larger than the preset number of projected frames, and n=n+1 and returning to S1121 under the condition that n is not larger than the preset number of projected frames;
    S1124: using a least square method to fit a relation curve function $L(x)=ax^2+bx+c$ between a plurality of groups of data source brightness value-ambient illuminance value data, wherein x is a data source brightness value of the projected image, L is an ambient illuminance, value of the projected image, and a, b and c are constants; and
    S1125: computing, according to the fitted relation curve function, an ambient illuminance value of the projected image when the data source brightness value of the projected image is 0, so as to obtain a final ambient illuminance value.

3. The self-adaptive adjustment method for brightness of the projection apparatus as claimed in claim 1, wherein S12 comprises:
    S121: acquiring the relation function $L(l, d)=\alpha \cdot l+\lambda \cdot d+\beta+r$ between the projection plane illuminance value and the ambient illuminance value as well as the projection distance value, wherein d is the projection distance value, l is the ambient illuminance value, L is the projection plane illuminance value, and $\alpha$, $\lambda$, $\beta$ and r are constants; and S122: substituting the acquired ambient illuminance value l and projection distance value d into the relation function between the projection plane illuminance value and the ambient illuminance value as well as the projection distance value for computation, so as to obtain a projection plane illuminance value.

4. The self-adaptive adjustment method for brightness of the projection apparatus as claimed in claim 3, wherein S121 comprises:

S1211: changing the ambient illuminance value at a same projection distance, adjusting projection to an optimal light and shadow effect, recording a corresponding projection plane illuminance value, so as to obtain a plurality of groups of ambient illuminance value-projection plane illuminance value data, and obtaining a curve relation function $L_l(l)=\partial \cdot l+\beta$ between the ambient illuminance value and the projection plane illuminance value through curve fitting, wherein l is the ambient illuminance value, L is the projection plane illuminance value, and $\partial$ and $\beta$ are constants;

S1212: changing a projection distance in a darkroom environment, adjusting projection to an optimal light and shadow effect, recording a corresponding projection plane illuminance value, so as to obtain a plurality of groups of projection distance-projection plane illuminance value data, and obtaining a curve relation function $L_d(d)=\kappa \cdot d+\gamma$ between the projection distance and the projection plane illuminance value through curve fitting, wherein d is the projection distance, L is the projection plane illuminance value, and k and y are constants; and S1213: obtaining the relation function $L(l, d)=\alpha \cdot l+\lambda \cdot d+\beta+r$ between the projection plane illuminance value and the ambient illuminance value as well as the projection distance value by combining the curve relation function between the ambient illuminance value and the projection plane illuminance value and the curve relation function between the projection distance and the projection plane illuminance value, wherein d is the projection distance, l is the ambient illuminance value, L is the projection plane illuminance value, and $\alpha$, $\lambda$, $\beta$ and r are constants.

5. The self-adaptive adjustment method for brightness of the projection apparatus as claimed in claim 1; wherein S13 comprises:

S131: computing a luminous component driving current value of the projection apparatus according to the projection plane illuminance value;

S132: determining whether the luminous component driving current value of the projection apparatus exceeds a maximum luminous component driving current value, proceeding to S134 under the condition that the luminous component driving current value of the projection apparatus exceeds the maximum luminous component driving current value, and proceeding to S133 under the condition that the luminous component driving current value of the projection apparatus does not exceed the maximum luminous component driving current value;

S133: adjusting a luminous component driving current to the luminous component driving current value; and S134: adjusting the luminous component driving current to the maximum driving current value, and adjusting an optical zoom factor of the projection apparatus according to a relation function between the projection plane illuminance value and the optical zoom factor.

6. The self-adaptive adjustment method for brightness of the projection apparatus as claimed in claim 5, wherein S133 comprises:

obtaining the relation function $H(S)=w \cdot S^2+v \cdot S+o$ between the projection plane illuminance value and the optical zoom factor, wherein $H \in (-1,1)$, S is a zoom factor, and w, v and o are constants;

computing a required zoom factor S according to $H(S)=(A_t-A_0)/A_0$ when the projection plane illuminance value is $A_0$ under the condition that a target projection plane illuminance value is $A_t$ and the zoom factor is not adjusted; and controlling an electric motor to drive the projection apparatus to adjust to the required zoom factor S.

7. The self-adaptive adjustment method for brightness of the projection apparatus as claimed in claim 6, wherein the obtaining the relation function between the projection plane illuminance value and the optical zoom factor comprises:

measuring a projection plane illuminance value, which is recorded as $A_0$, in a darkroom environment and at a fixed projection distance when the zoom factor is not adjusted;

adjusting the optical zoom factor to $S_1$, measuring the projection plane illuminance value as $A_1$, computing a change percentage $$H_1 = \frac{A_1 - A_0}{A_0}$$

of the projection plane illuminance value of the projection apparatus, so as to obtain data $(S_1,H_1)$, and similarly to further obtain $(S_2,H_2)$, $(S_3,H_3)$, $(S_n,H_n)$; and using a least square method to fit the obtained data set, and obtaining the relation function $H(S)=w \cdot S^2+v \cdot S+o$ between the projection plane illuminance value and the optical zoom factor, wherein $H \in (-1,1)$, S is a zoom factor, and w, v and o are constants.

8. A self-adaptive adjustment system for brightness of a projection apparatus, comprising:

a collection control component configured to collect an ambient illuminance value and a projection distance value of the projection apparatus;

the collection control component is further configured to project an nth frame of projected image, wherein n is a positive integer, collect the ambient illuminance value at least twice in a projection gap period, determine whether n is larger than a preset number of projected frames, in response to that n is larger than the preset number of projected frames, compute a trimmed mean of all collected ambient illuminance values, so as to obtain a final ambient illuminance value, in response to that n is not lamer than the preset number of projected frames, n=n+1 and project an nth frame of projected image;

an illuminance value computing component configured to compute a projection plane illuminance value of the projection apparatus according to a relation function between the projection plane illuminance value and the ambient illuminance value as well as the projection distance, value and the, acquired ambient illuminance value and projection distance value of the projection apparatus; and a brightness adjusting component configured to adjust brightness of the projection apparatus according to the projection plane illuminance value of the projection apparatus.

9. A self-adaptive adjustment system for brightness of a projection apparatus, comprising:
- a memory configured to store a computer program; and
- a processor configured to execute the computer program so as to implement steps of the self-adaptive adjustment method for brightness of a projection apparatus as claimed in claim 1.

* * * * *